United States Patent
Holt et al.

(10) Patent No.: US 11,575,126 B2
(45) Date of Patent: Feb. 7, 2023

(54) ENERGY STORAGE MATERIAL AND METHOD OF PRODUCING THE SAME

(71) Applicant: pH Matter, LLC, Columbus, OH (US)

(72) Inventors: Christopher T Holt, Bexley, OH (US); Mary C Cramer, Columbus, OH (US); Paul H. Matter, Columbus, OH (US)

(*) Notice: Subject to any disclaimer, the term of this patent is extended or adjusted under 35 U.S.C. 154(b) by 200 days.

(21) Appl. No.: 16/411,421

(22) Filed: May 14, 2019

(65) Prior Publication Data
US 2019/0355980 A1  Nov. 21, 2019

Related U.S. Application Data

(60) Provisional application No. 62/672,262, filed on May 16, 2018.

(51) Int. Cl.
*H01M 4/36* (2006.01)
*H01M 4/48* (2010.01)
(Continued)

(52) U.S. Cl.
CPC ........... *H01M 4/366* (2013.01); *H01M 4/483* (2013.01); *H01M 4/625* (2013.01); *H01M 4/628* (2013.01);
(Continued)

(58) Field of Classification Search
CPC ...... H01M 4/366; H01M 4/483; H01M 4/625; H01M 4/628; H01M 10/0525; H01M 2004/021; H01M 4/386; Y02E 60/10
See application file for complete search history.

(56) References Cited

U.S. PATENT DOCUMENTS 3,551,533 A * 12/1970 Monforte ................ B01J 2/06
264/14
8,617,746 B2  12/2013 Mah et al.
(Continued)

FOREIGN PATENT DOCUMENTS

CN   101894940  * 11/2010   ............. Y02E 60/10
CN   107579203  *  1/2018   ............. Y02E 60/10
(Continued)

OTHER PUBLICATIONS

English Translation of KR2014/0112451.*
(Continued)

*Primary Examiner* — Kiran Quraishi Akhtar
(74) *Attorney, Agent, or Firm* — Michael J. Gallagher; Luper Neidenthal & Logan

(57) ABSTRACT

The instant invention includes a spherical porous secondary silicon-based particle and methods for producing the same. The spherical porous secondary silicon-based particle is comprised of agglomerated primary silicon-based nanoparticles. The secondary particle comprises a carbon coating that reduces the effective exposed surface area of the primary particles to the electrolyte, thus improving first cycle efficiency. The secondary particle further comprises porous regions that enable the silicon nanoparticles to expand during lithiation. Advantages include ease of castability with micron-sized spherical particles, ease of mixing spherical particles, ease of flow for spherical particles in various processing steps, and ease with obtaining higher loading, which translates to higher areal capacity and overall energy density of the cell. A readily scalable process for producing the particles using low-cost materials and low-cost processing methods is disclosed.

4 Claims, 9 Drawing Sheets

Diagram of spherical agglomerated porous $SiO_{2-x}$ where x=0 to 2 nanoparticles with carbon stabilizing coating.

(51) Int. Cl.
H01M 10/0525 (2010.01)
H01M 4/62 (2006.01)
H01M 4/02 (2006.01)

(52) U.S. Cl.
CPC ............. H01M 10/0525 (2013.01); *H01M 2004/021* (2013.01)

(56) References Cited

U.S. PATENT DOCUMENTS

| | | | |
|---|---|---|---|
| 8,945,774 B2 | 2/2015 | Coowar et al. | |
| 2012/0328943 A1* | 12/2012 | Mah | H01M 10/0525 429/211 |
| 2013/0189575 A1* | 7/2013 | Anguchamy | H01M 4/134 429/211 |
| 2014/0080011 A1* | 3/2014 | Kim | H01M 8/0241 429/401 |
| 2018/0145316 A1* | 5/2018 | Moon | H01M 10/052 |
| 2018/0151874 A1* | 5/2018 | Kim | H01M 4/386 |

FOREIGN PATENT DOCUMENTS

| | | | | |
|---|---|---|---|---|
| KR | 101372464 | * | 3/2014 | ......... B01D 39/2093 |
| KR | 2014/0112451 | * | 9/2014 | .......... H01M 10/052 |
| WO | WO2017/052281 | * | 3/2017 | ............ H01M 4/134 |

OTHER PUBLICATIONS

English Translation of CN107579203.*
English Translation of KR101372464.*
English Translation of CN101894940.*

Zhao, J., et al, Artificial solid electrolyte interphase-protected, LixSi Nanoparticles: An efficient and stable prelithiation agent for lithium ion batteries, 2015, JACS, DOI:10.1021/jacs.5b04526.
Chandrasiri, K.W., et al., Citric acid based Pre-SEI for improvement of silicon electrodes in lithium ion batteries, J. Electrochem Soc., 2018, 165 (10) A1991-A1996.
Zhu, C., et al, Achieving High-Performance silicon anodes of lithium ion batteries via atomic and molecular layer deposited surface coatings: an overview, Electrochimca Acta, 2017, 251, 710-728.
Liu, N., et al., A pomegranate-inspired nanoscale design for large-volume-change-lithium battery anodes, Nature Nanotechnology, 2014, 9, 187-192.
Takamura, T.; Ohara, S.; Uehara, M.; Suzuki, J.; Sekine, K., J. Power Sources 2004 , 129, 96.
Chan, C. K., et al., High-performance lithium battery anodes using silicon nanowires, Nature Nanotechnology, 2008, 3, 31.
Bates, J. B., et al., Thin film lithium and lithium ion batteries, Solid State Ionics, 2000, 135, 33.
Wu, H., et al, Designing nanostructured Si anodes for high energy lithium ion batteries Nano Today, 2012, 7, 414.
Ge, M., et al., Porous Doped Silicon Nanowires for Lithium Ion Battery Anode with Long Cycle Life Nano Lett., 2012, 12, 2318.
Yoo, J. K., et al., Scalable fabrication of silicon nanotubes and their application to energy storage Adv. Mater., 2012, 24, 5452.
Park, M. H., et al., Silicon Nanotube Battery Anodes, Nano Lett., 2009, 9, 3844.
Kim, H., et al., Three-dimensional porous silicon particles for use in high-performance lithium secondary batteries., Angew. Chem. Int. Ed., 2008, 47, 10151.
Zhou, X., et al., Self-Assembled Nanocomposite of Silicon Nanoparticles Encapsulated in Graphene through Electrostatic Attraction for Lithium-Ion Batteries, Adv. Energy Mater., 2012, 2, 1086.
Liu, N., et al., A Yolk-Shell Design for Stabilized and Scalable Li-Ion Battery Alloy Anodes, Nano Lett., 2012, 12, 3315.

* cited by examiner

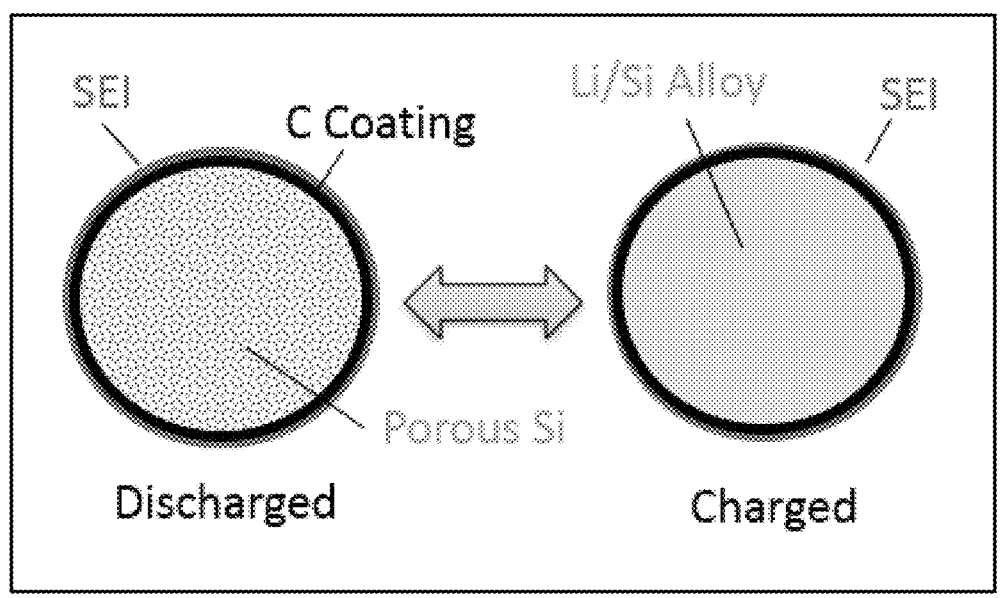
Figure 1. Diagram of spherical agglomerated porous $SiO_{2-x}$ where x=0 to 2 nanoparticles with carbon stabilizing coating.

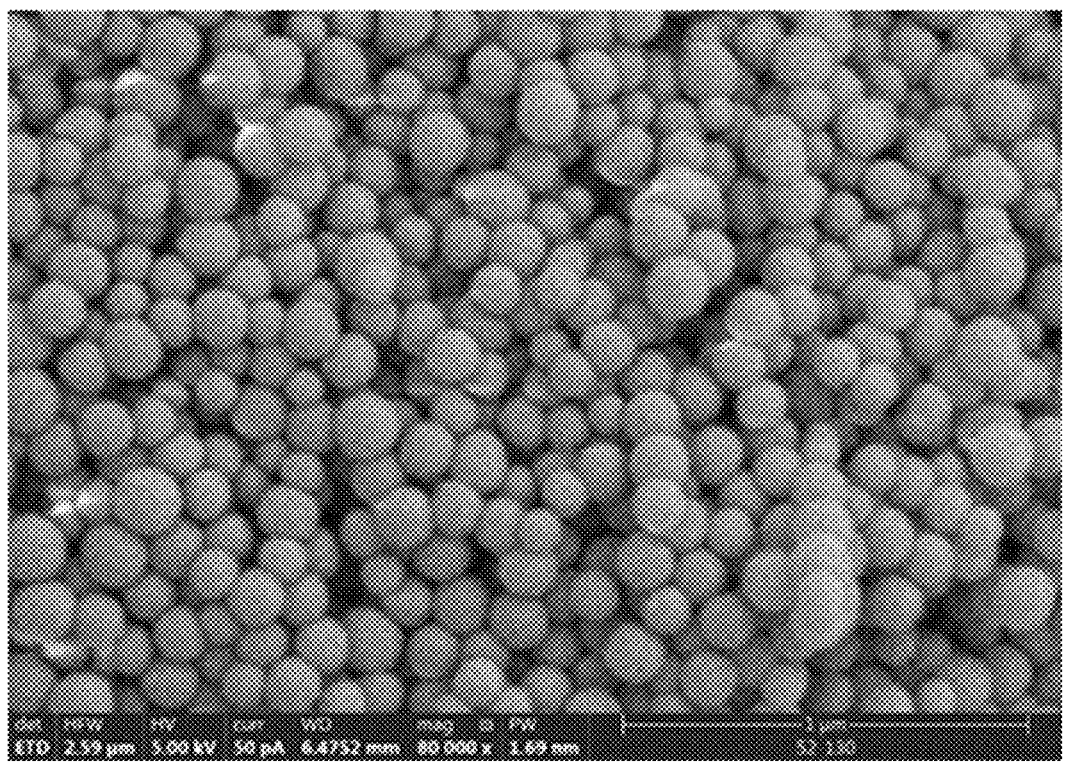
Figure 2. SEM image of precursor silica nano-particles

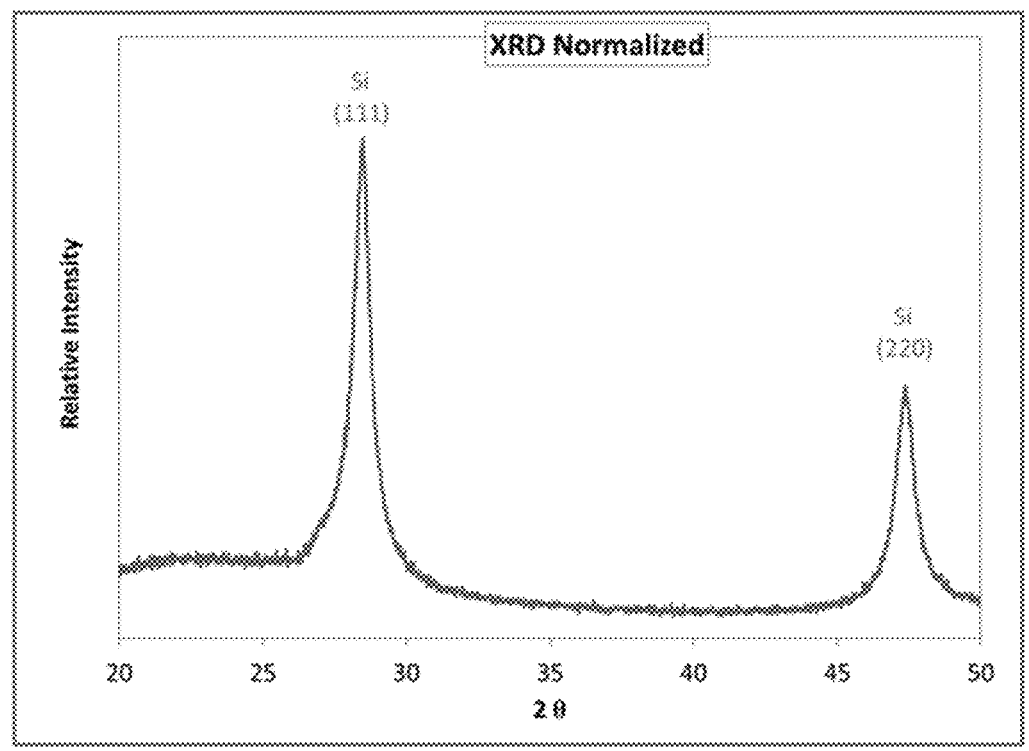
Figure 3. XRD of silicon nanoparticles showing small degree of amorphous silicon oxide at 20-25 2-theta.

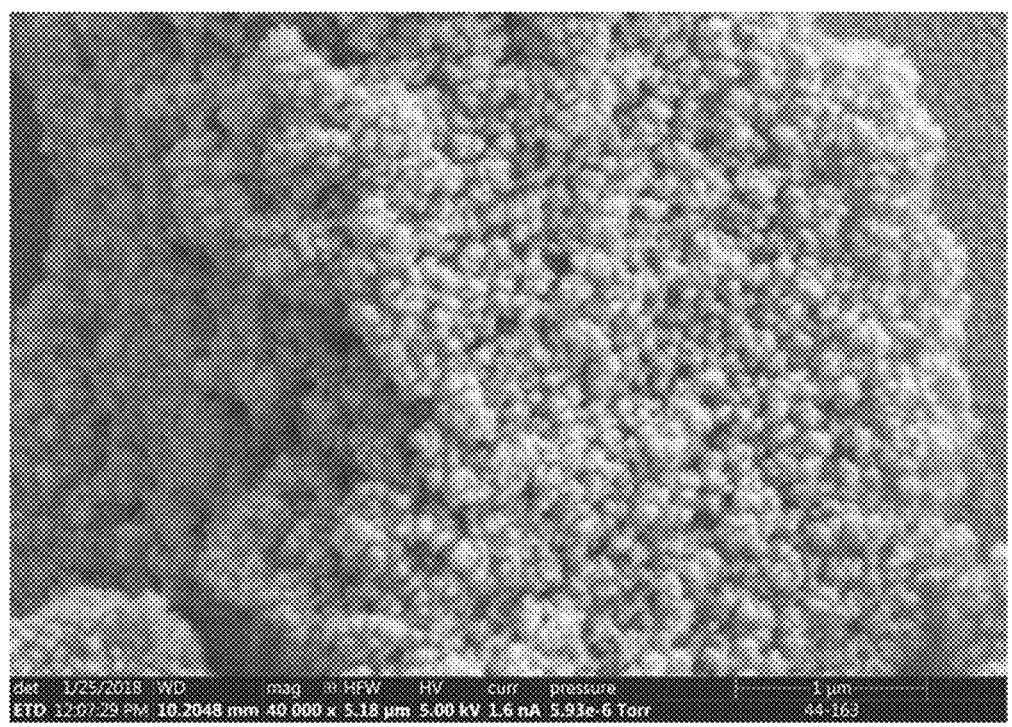
Figure 4. SEM of SiO$_{2-x}$ (where X>0 and less than or equal to 2) nanoparticles before spray drying.

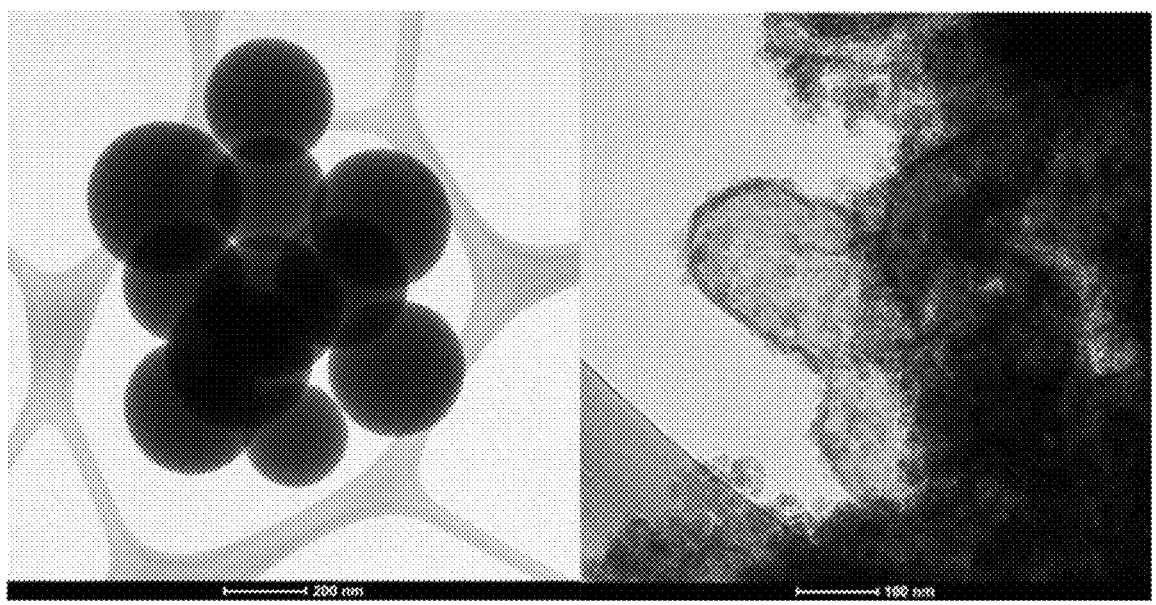
Figure 5. TEM of silica precursor (left) and metallurgically reduced porous silicon nanoparticles (right)

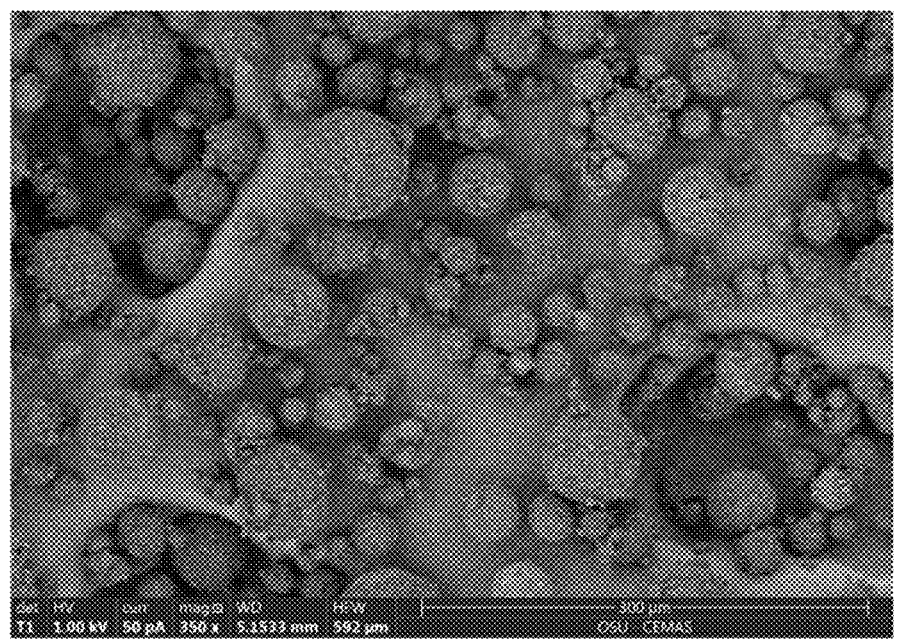
Figure 6. Low magnification SEM image of spray-dried nano-particle $SiO_{2-x}$ (where X>0 and less than or equal to 2) showing highly spherical nature; image taken before sieving to specific particle size.

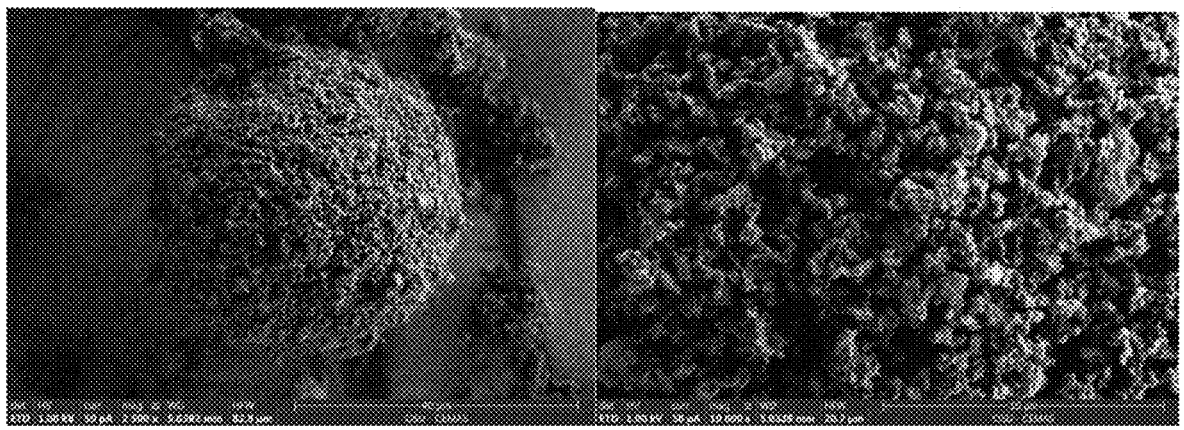
Figure 7. High magnification SEM image of spray-dried $SiO_{2-x}$ (where X>0 and less than or equal to 2) showing spherical nature of agglomerated particle and high degree of internal porosity.

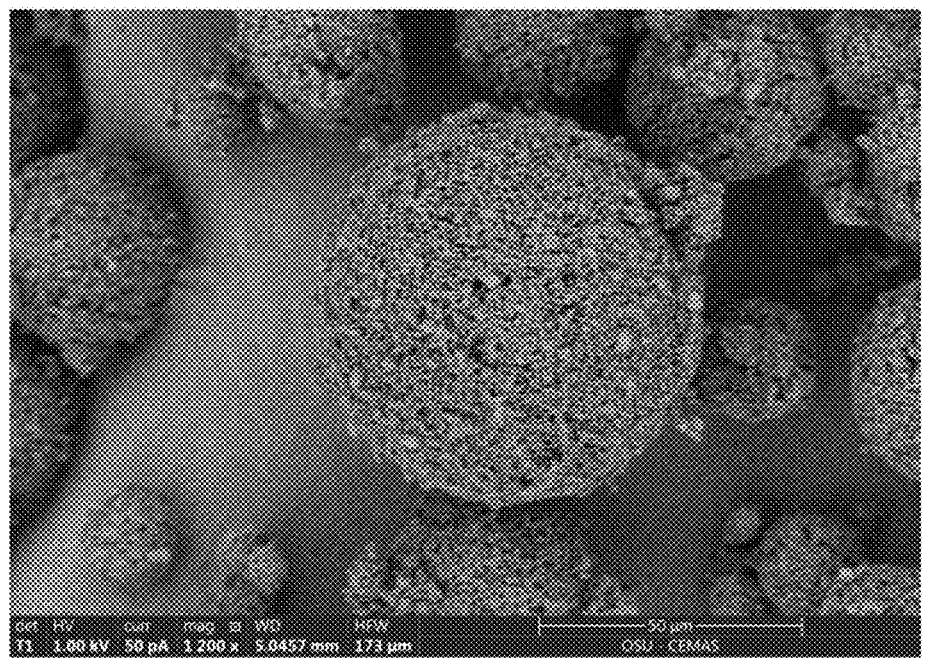
Figure 8. High magnification SEM image of spray-dried $SiO_{2-x}$ (where X>0 and less than or equal to 2) with carbon coating showing spherical nature is maintained after carbon deposition.

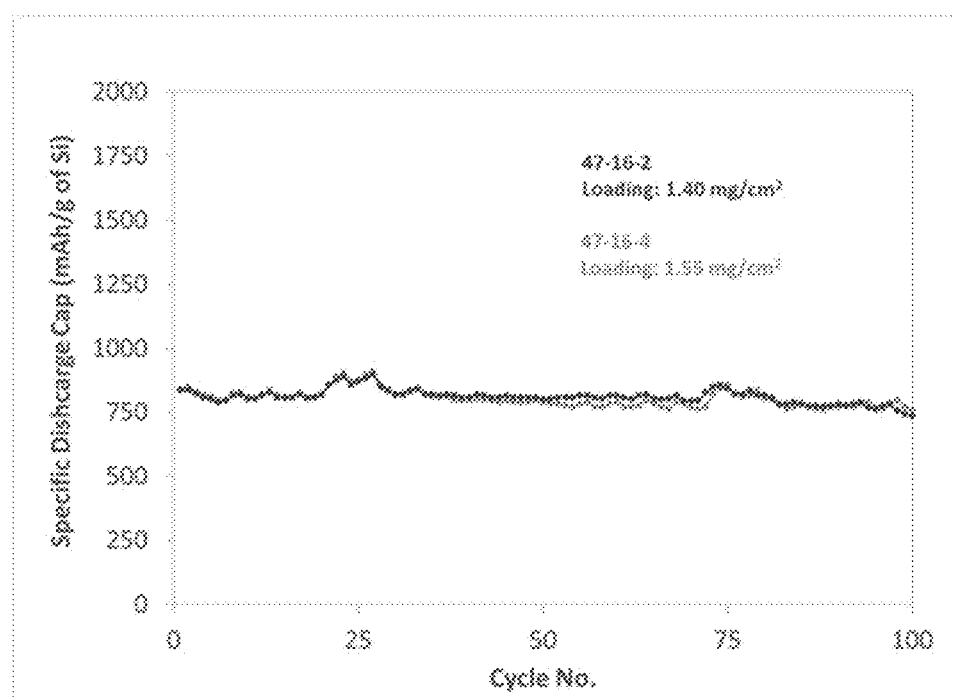
Figure 9. Half-cell performance of carbon-coated silicon particles vs. Li/Li+.

ENERGY STORAGE MATERIAL AND METHOD OF PRODUCING THE SAME

CROSS-REFERENCE TO RELATED APPLICATIONS

This application claims the benefit of U.S. Provisional Patent Application 62/672,262, filed on May 16, 2018.

STATEMENT REGARDING FEDERALLY SPONSORED RESEARCH OR DEVELOPMENT

This invention was made with government support under Department of Energy Contract DE-SC0017724. The government may have certain rights in the invention.

TECHNICAL FIELD

The present disclosure relates generally to the field of lithium ion batteries, particularly to a carbon-coated spherical particle that is useful in forming such batteries.

BACKGROUND OF THE INVENTION

One route to increase the energy density of lithium-ion batteries (LIB's) is the use of a silicon-based anode. Unlike conventional graphite anodes, which only have capacity of one lithium ion per six carbon atoms (372 mA-h/g), silicon-based anodes have a theoretical capacity for 4.4 lithium ions per silicon atom (4,200 mA-h/g). With this capacity, specific energy greater than 350 W-h/kg at the cell level becomes possible. Indeed, researchers have demonstrated thin-film silicon-based anodes with capacity greater than 3,000 mA-h/g over one thousand cycles at 12 C.

However, silicon-based anodes have yet to achieve widespread commercialization due to several significant differences from graphite-based anodes. First, silicon is semiconducting, thus limiting the use of thick anodes without a conductive additive. To match the energy storage capacity of conventional LIB cathodes, a silicon anode must be greater than about 5 microns thick. A second hurdle for silicon anodes is the large volume expansion that occurs during lithiation of the silicon. The volume of silicon increases by approximately 300% during the process. In films thicker than 50 nanometers, this expansion can lead to cracking and delamination of the silicon. In anodes made from thick coatings of silicon particles, pulverization of the anode layer ultimately occurs. Further, with conventional silicon particle anodes, the volume expansion results in an unstable surface electrolyte interface (SEI) that consumes lithium and spalls with each charge/discharge cycle. However, research has demonstrated that sufficiently thin silicon coatings can withstand the problems associated with the volume expansion. Unfortunately, such thin coatings do not have substantial energy storage capacity.

Recent research has demonstrated novel silicon nanoparticle approaches that perform well in terms of capacity and stability. However, thick films of silicon nanoparticles have yet to be adopted commercially. Challenges with silicon nanoparticles include poor first cycle efficiency due to the high surface area of silicon. Additionally, obtaining high areal loadings of silicon during processing is difficult due to low nanoparticle tap density, and challenges with processing nanoparticle inks in conventional equipment. These challenges include high viscosity of nanoparticle inks at sufficient loading and cracking of coating layers during drying.

Several strategies have been studied by researchers in order to prevent the pulverization and decay of silicon anodes. Initial efforts to control the volume expansion of silicon were directed to decreasing the grain size of silicon materials. When bulk silicon is replaced by nanostructured silicon materials, the specific surface area is increased. The voids between the nanosilicon materials can help to mitigate the volume expansion during the charge/discharge processes. By using silicon nanowires, nanotubes or nanoparticles, the cyclability of silicon anode is significantly improved. Half-cells with over 250 cycles have been reported. However, most results in the literature are obtained from half-cell tests with small electrode mass loading. Similarly, researchers have demonstrated a 2-D thin-film silicon-based anode (50 nm thick) with capacity greater than 3,000 mA h/g over one thousand cycles at 12 C, but again, the mass loading of silicon is quite low at 50 nm. Approximately 1-5 microns of silicon is required to match the capacity per area of a commercial graphite anode. When silicon mass loading increases, it becomes more challenging to control the volume expansion by voids in the nano-size silicon materials.

Carbon coating or compositing of the silicon materials is another effective way to suppress the pulverization of silicon anode. Various carbon coating techniques have included chemical vapor deposition, pyrolysis of organic molecules coating the silicon, and graphene wrapping. The carbon-coated silicon materials have proved to have better cycling performance compared to the bare nanostructured silicon materials. Carbon coatings can form a rigid carbon shell on the surface of nanostructured silicon. However, when the volume expansion of the silicon is large, the carbon shell may break, and silicon electrode may still pulverize. Therefore, a core-shell structure design with large carbon shell and small silicon core was proposed. The void was preformed between the shell and core, which allowed large volume expansion without breaking the conductive rigid carbon shell. The cyclability of the silicon anode can be further enhanced, although it has yet to be achieved at high loadings.

Another method to address this silicon degradation issue is to use surface modification to enhance the stability of the silicon surface and limit the degree of SEI formation as a result of the electrolyte decomposition. Numerous researchers have evaluated this artificial SEI concept and it has been demonstrated at the R&D stage. For instance, one process formed a stable SEI by reducing 1-fluoro decane on the lithiated nano-Si surface to form a mix of lithium fluoride and lithium alkyl carbonate. While significant improvements of first cycle efficiency and cyclability were realized, the anodes tested consisted of graphite dominant anodes with low stabilized silicon loadings (5 weight percent) and the use of this technology in a silicon dominant high energy cell has yet to be reported.

Other researchers have evaluated reactive agents such as citric acid to form lithium citrate to generate a preformed SEI and demonstrated improved capacity retention over untreated silicon nanoparticles, but capacity retention was still low (~60% at 50 cycles). One of the more promising concepts related to forming stable silicon and electrolyte interfaces involves the use of ALD (atomic layer deposition) on silicon to form a stable interface between the active anode and electrolyte. ALD is a thin film technique that can form conformal coatings over complex structures. Coatings that have shown promising results when evaluating cyclability include alumina ($Al_2O_3$) and titania ($TiO_2$). Although, ALD coatings have been demonstrated to improve the performance of silicon electrodes, they still do not address the issues of long-term cyclability with high capacity retention.

Numerous groups are developing silicon anode technologies. Most published results on this work are related to various strategies for growing silicon nano-fibers via CVD methods using silane-based precursors, as well as utilizing mixing/milling procedures to add the silicon to standard graphite. U.S. Pat. No. 8,945,774 describes a porous anode comprising structured electroactive material-containing particles that are Si, Sn, Ge, and Ga fibers, tubes, ribbons, and flakes structured to provide space between or within the particles for the expansion of the electroactive material during lithiation. U.S. Pat. No. 8,617,746 describes a Si/C composite that includes carbon (C) dispersed in porous silicon (Si) particles. Existing approaches either use nano-silicon produced from silane, which has higher cost than silica and is dangerous to process, meaning significant safety measures need to be put in place in order to process the material. Because most silane processes involve high vacuum systems, scalability to the tonnage level would be difficult. Approaches that utilize dense (non-porous) micron-based silicon materials require significant milling to obtain sub-micron particles, however separation of larger particles >1 micron are difficult without expensive investment (cyclone separation). Imparting porosity to dense micron sized silicon involves harsh acids, e.g., hydrofluoric acid (HF), and secondary catalysts, such as silver.

In general, the patented silicon anode technologies rely on either: (a) nanowires that are expensive to produce and mechanically fragile which can result in loss of performance due to fracturing and compaction issues during anode calendaring, (b) composites of silicon and carbon that have not yet demonstrated a capability to prevent capacity fade due to electrolyte reaction with silicon or issues associated with expansion, or (c) silicon wafer technology that is incompatible with current LIB manufacturing. One of the biggest issues with using nano-materials in batteries is significant first cycle efficiency loss, due to the high surface area of the active materials reacting with the lithium ions during the initial charge. These first cycle efficiency losses can be >50% for some nano-silicon materials.

The present invention, in numerous embodiments, answers many of these long-felt issues and needs.

SUMMARY OF THE INVENTION

The instant invention as disclosed in multiple embodiments, all meant by way of example only and not limitation, may include a spherical porous secondary silicon-based particle comprised of agglomerated primary silicon-based nanoparticles. In this specification silicon is meant to broadly mean $SiO_{2-x}$ where X is greater than 0 and less than or equal to 2. Thus, silicon may include Si metal, Si monoxide, doped Si, mixtures of SiO2 and silicon or silicon monixide (including in the form of surface coatings on silicon), intermediate sub oxides of silicon, and mixtures thereof. The secondary particle comprises a carbon coating (FIG. 1) that reduces the effective exposed surface area of the primary particles to the electrolyte, thus improving first cycle efficiency. The secondary particle further comprises porous regions that enable the silicon nanoparticles to expand during lithiation. In some embodiments a stabilizing silicon oxide phase is also present in combination with the silicon. The instant invention, in various embodiments, may also include a method for producing the particles. In one method the secondary particles are produced by spray-drying the primary particles and by further carbon coating the secondary particle. Advantages include ease of castability with micron-sized spherical particles, ease of mixing spherical particles, ease of flow for spherical particles in various processing steps, and ease with obtaining higher loading, which translates to higher areal capacity and overall energy density of the cell. The porous core retains activity but results in significantly less first cycle efficiency due to lower surface area of the coated spherical porous carbon-coated secondary particle. Further advantages of the invention process are the use of low-cost earth abundant elements such as silica, calcium, and magnesium to produce the porous silicon, and low-cost carbon precursors (both solid and gas phase) to coat the porous particles. Forming agglomerates through spray-drying processes is a readily scalable process.

In yet other embodiments, the energy storage material may be applied to a variety of devices, including by way of example only and not limitation, and as would be known to one skilled in the art, such devices as a lithium-ion battery and/or a capacitor electrode.

One skilled in the art would know multiple methods for building and utilizing the devices and procedures outlined in the present teaching.

BRIEF DESCRIPTION OF THE ILLUSTRATIONS

Without limiting the scope of the electrochemical cell as disclosed herein and referring now to the drawings and figures:

FIG. 1 shows a schematic diagram of spherical agglomerated $SiO_{2-x}$, (where x>0 and less than or equal to 2) nanoparticles with a carbon stabilizing coating, further showing a surface electrolyte interface (SEI);

FIG. 2 shows a scanning electron micrograph (SEM) of precursor silica nanoparticles according to an embodiment of the present invention;

FIG. 3 shows an XRD of porous silicon showing a small degree of amorphous silicon oxide at 20-25 2-theta;

FIG. 4 shows a SEM of $SiO_{2-x}$ (where X>0 and less than or equal to 2) nanoparticles, before spray drying, according to an embodiment of the present invention;

FIG. 5 shows a TEM of silica precursors (left) and metallurgically reduced porous silicon nanoparticles (right);

FIG. 6 shows a low magnification scanning electron microscope (SEM) image of spray-dried nano-particle $SiO_{2-x}$ (where X>0 and less than or equal to 2) showing, with the image taken before sieving to specific particle size;

FIG. 7 shows a high magnification SEM image of spray-dried $SiO_{2-x}$ (where X>0 and less than or equal to 2) showing spherical nature of agglomerated particles and high degree of internal porosity;

FIG. 8 shows a high magnification SEM image of spray dried $SiO_{2-x}$ (where X>0 and less than or equal to 2) with carbon coating showing spherical nature is maintained after carbon deposition; and FIG. 9 shows half-cell performance of carbon-coated silicon particles vs. Li/Li+.

These illustrations are provided to assist in the understanding of the exemplary embodiments of an energy storage material, and a method for producing the same, as described in more detail below, and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Examples

Example 1

Method for Producing Primary Silicon Nanoparticles from Silica

Porous silicon nanoparticles can be produced through metallurgical reduction of silica, silicon oxide, or $SiO_{2-x}$ (X>0 and less than or equal to 2) with an alkali, alkaline metal, or appropriate group 3 metal (Li, Na, K, Rb, Cs, Fr/Be, Mg, Ca, Sr, Ba, Ra, B, Al, Ga, In, Th) with Mg or Ca being the preferred choice. The silicon can be produced through a wide range of silica precursors, both doped and undoped, dry powder, and aqueous and organic dispersions and can vary from 20-800 nm (FIG. 2). First, in a preferred embodiment, silica nanoparticles and reactive metal are combined in 0.8:1 to 1.5:1 silica to metal ratios. In some embodiments it may be useful to use excess magnesium to completely consume the silica, where excess magnesium-silicide can be converted back to MgO and Si through oxidation. After mixing, the reactants are placed in a reactor under inert gas environment (Ar, N, He). The reaction is typically done in excess of 650° C. for 2 to 10 hours. After reaction, the metal oxides (i.e., MgO, CaO) are removed with an appropriate acid solution, such as 1 M HCl, and subsequently washed in water to remove salts to obtain a mix of silicon and silicon oxide with varying degrees of oxidation (FIG. 3) with porous silicon produced (FIG. 4, FIG. 5, and Table 1, immediately below). In some embodiments it may be preferred to remove MgO in a later step to induce additional porosity in agglomerated particles. This method provides an example for producing the primary silicon nanoparticles with a composition of $SiO_{2-x}$ (where X is >0 and less than or equal to 2).

TABLE 1

Surface Area Porosity Comparisons of Engineered Si

| | B.E.T. Surface Area ($cm^2/g$) | Porosity ($cm^3/g$) | First Cycle Efficiency (%) Full Cell |
|---|---|---|---|
| Initial as synthesized | 88.2 | .272 | 34.1 |
| Spray Dried | 59.2 | .197 | 57.5 |
| Carbon Coated | 29.7 | .129 | 60.0 |

Those skilled in the art would appreciate that a number of various processes could be used to produce primary silicon nanoparticles, including milling of larger silicon through high energy means such as attrition or ball milling, CVD of silane onto carbon, CVD of silane onto catalytic metals, laser ablation of silane or dense silicon sources, PVD sputtering to generate nanosilicon particles, alloying of silicon with other metals, such as aluminum, and then subsequent etching or dissolution of the metallic phase with an acid to generate nanostructures/features, or mixtures thereof.

Those skilled in the art would also appreciate that the primary silicon nanoparticles may be further modified, including: carbon coating through hydro-carbon source pyrolysis, carbon coating through thermo-setting polymer pyrolysis, carbon coating through thermoplastic polymer pyrolysis, protective oxide coating to provide a compressive layer to limit expansion during lithiation, artificial SEI coating with conductive lithium electrolyte or refractory phase such as alumina to impart SEI stability, milling with graphite to impart SEI stability, milling with graphene to impart SEI stability, milling with carbon nanotubes or carbon fibers to improve conductivity, doping with phosphorus, boron, arsenic, and/or aluminum to boost conductivity and improve durability, surface attachment of carbon species (particles/fibers/tubes) to improve conductivity, and mixtures thereof.

Example 2

Method for Producing Spherical Secondary Porous Silicon-Based Particles

Primary silicon nanoparticles can be processed into spherical secondary particles through a spray method, including freeze or spray-drying, with particle sizes ranging from 1 micron to 200 microns (see FIG. 6). These agglomerated particles maintain significant porosity (see FIG. 7). For the freeze-drying process, porous silicon produced by the method in Example 1 was diluted down to 17 vol % in water with small percentage (~1%) of binder (PEG) and dispersant (PAA) to obtain higher viscosity. The sample was sonicated twice, using an ultrasonic probe, for 5 minutes to disperse, then wet-sieved at 250 um. The mixture was then sprayed at a liquid flow of 1 liter/hour and air pressure of 0.3 bars. The spray uses an atomizer such as a spray-nozzle to disperse the slurry to controlled droplets. Ultrasonic nozzles generate particles between 10 and 300 microns. This is a standard process method to produce a consistent particle size distribution. In one embodiment, hot air is used to dry the atomized liquid particles. In a preferred embodiment, the mixture may be freeze-dried. In the freeze-drying process, the frozen liquid phase is removed by low-temperature dehydration by lowering the pressure and sublimating the liquid carrier to obtain a consistent particle size distribution of the agglomerated silicon particles. The average particle size may be further reduced through physical sieving to a target particle size.

Those skilled in the art would appreciate that a number of variations to the process could be used to produce secondary silicon nanoparticles, including:

Spraying of graphite and $SiO_{2-x}$ (where X is >0 and less than or equal to 2) mixtures Spraying with conductive carbon pre-coated on the porous silicon Use of alternative binders in the mixture, such as binders that bond to bond to silicon and carbon or graphite Drum drying with liquid particles drying over rotating drums Pulse combustion drying to handle higher viscosity suspensions Including pore formers with the mixture, such as soluble compounds or volatile compounds, that can be removed in later steps to form more porosity in the secondary particle. Examples of pore formers could include water soluble salt, magnesium oxide, ammonium carbonate, or mixtures thereof.

Using alternative silicon particles or further modified silicon particles, as listed in Example 1.

Addition of other metals that can alloy with lithium, such as tin.

Combinations of the strategies listed above.

Example 3

Method for Carbon Coating Spherical Secondary Porous Silicon-Based Particles The secondary particles may be coated with carbon through a gas phase decomposition of hydrocarbons process, ranging from 550-2000° C., in an inert atmosphere (e.g., Ar, N, He or forming gas 5% hydrogen). Solid precursors can also be used to form adherent carbon coatings through aqueous based processing of a water-soluble carbon precursor (poly-acrylic acid, sucrose, glucose), or solid mixing of carbon-based precursors (poly-acrylonitrile). The carbon source could also be a thermo-plastic or thermosetting polymer in appropriate solvent.

In one embodiment, the silicon-based particles prepared by Example 2 may be coated by ethylene. In a typical reaction, a batch of silicon particles 25 grams are placed in a controlled-atmosphere pyrolysis reactor and treated under an argon/5% hydrogen environment in the reactor hot-zone at 950° C., flowing at 1 L/min. Once at the 950° C. cracking temperature the sample is exposed to ethylene gas for 30 minutes with a flow rate of 487 sccm. The forming gas environment is maintained on cooling. The agglomerated particles maintain a spherical structure after carbon coating (see FIG. 8).

In a preferred embodiment, 25 grams of silicon-based particles prepared by Example 2 are coated by acetylene in a controlled-atmosphere pyrolysis reactor under an argon/5% hydrogen environment in the hot-zone maintained at 650° C., with the argon/5% hydrogen flowing at 1 L/min. Once at the 650° C. cracking temperature, the acetylene is flowed at 100 sccm for 2 hours in order to carbon coat the particles. The 5% hydrogen/argon gas environment is maintained on cooling of the sample.

Those skilled in the art would appreciate that a number of variations to the process could be used to carbon-coat agglomerated silicon particles, including
- Use of alternative hydrocarbon gas precursors and cracking at different temperatures
- Use of liquid phase carbon sources and carrier gas combinations (i.e., acetonitrile and inert carrier gas) and cracking on silicon surface at high temperature
- Use of solid or semi-solid carbon sources
- Use of high molecular weight polymers as a carbon source for pyrolysis, the high-molecular weight polymer with an average molecular diameter larger than the secondary particle pores would preferentially coat the outside of the particle
- Mixtures or combinations thereof Further, in some embodiments it may be preferred to perform an initial carbon coating, followed by removal of pore formers, followed by one or more additional carbon coatings. This approach would impart more porosity within the secondary particle.

Example 4

Method for Carbon Coating of Spherical Secondary Porous Silicon-Based Particles In another embodiment, the silicon-based particles prepared by Example 2 were coated by poly-acrylonitrile (PAN) where the PAN was thoroughly mixed with the porous silicon particles by dry mixing of powders. In a typical experimental batch, 0.5 g of porous silicon and 0.015 g PAN were added to a mortar and pestle and ground together, in a 1″ tube furnace under 5% Hydrogen/Nitrogen at 150 sccm with the following temperature profile 200° C. for 1 hour, 600° C. for 1 hour with a 3° C./min heating rate, and then subsequently cooling to room temperature to obtain porous silicon with carbon coating.

In a second embodiment, the PAN is dissolved in a polar solvent (ethylene carbonate) and mixed with the silicon and dried to obtain a more thorough/intimate mixture between the porous silicon and PAN. The PAN is subsequently pyrolyzed using the thermal/heating schedule described above.

Those skilled in the art would appreciate that a number of variations to the process could be used to carbon-coat agglomerated silicon particles, including:
- Use of a water-soluble carbon precursor such as sugar
- Use of dry mixing of sugar
- Use of a water-soluble polymer such as poly-acrylic acid
- Use of dry-mixing of poly-acrylic acid
- Use of phenol resin dissolved in acetone
- Use of polyolefin (such as polyethylene) either dry mixed or dissolved in a solvent.
- Removal of pore formers following an initial carbon coating, followed by a second carbon coating The porous silicon can also be produced from a spray dried silica precursor with a carbon coating produced through a gas phase carbon source, or solid coating through incipient wetness of a soluble carbon source. The carbon coated silica agglomerate with adequate void space (up to 300 vol % of initial particle volume) may then be metallurgically reduced to form an intact carbon shell with phase pure silicon, unreacted silicon oxide particles, and adequate void space for silicon expansion.

Example 5

Lithium-Ion Battery Anode Containing Particles

To demonstrate the performance in a lithium-ion anode, anodes containing porous silicon with carbon coatings prepared by the method described in Example 3 were prepared. The silicon particles were combined with additives including conductive agents (0-10 wt %), graphite (20-35 wt %) and a binder of poly-acrylic acid (10-20 wt %) to produce an anode ink. For a typical ink, 3.5 g NMP, 0.175 g PAA, and 0.084 g Super PC are added to vacuum mixing cup. The slurry is then pumped down in a vacuum mixer to remove bubbles, and at least −0.9 MPa is obtained while mixing for 2 minutes. After two minutes of mixing (320 rpm), any clumps off the mixing blade or sides are scraped into the cup. After initial mixing, 0.294 g MCMB (graphite) are added to the vacuum mixing cup, the ink with graphite is pumped down to −0.9 MPa and mixed again for 2 minutes. An additional 0.25 g NMP is added to the cup and 0.294 g of porous silicon is added. The mixer is pumped down again, and the ink system is mixed for together for 30 minutes under vacuum. Electrodes are cast after ink formulation. The doctor blade is set to 250-300 microns (wet height) and the electrode is cast at 1 cm/sec and dried at 60° C. for 1 hour and subsequently vacuum dried 100° C. for 1 hour. The electrodes can also be prepared by adding a pre-lithiating agent, such as lithium metal particles or lithium salt to further boost first cycle efficiency. Half-cell button cells (CR2032 format) were constructed to analyze the performance of the porous silicon. The fabrication of half-cells consisted of a cathode, Celgard separator, and the silicon anodes.

Specifically, the cathode used in the half-cell was lithium metal foil. To avoid oxidation, the cell was assembled in an argon-filled glove box with moisture and oxygen below 0.5 ppm. A standard 1 M lithium salt (LiPF6) dissolved in EC:DEC electrolyte with FEC additive at 10-wt % was used for the electrochemical characterization. After cell construction, the cells were rested overnight before testing. For the half-cell measurements, the cutoff voltage of 0.005V (lithiation) and 1.5V (delithiation) vs. lithium metal was used for charge discharge cycling, with a rest period of 10 minutes between charge and discharge. Initial cycling of 3 cycles and a target rate of C/10 was used for the formation cycling. Subsequent cycles at C/3 were used to observe the impact of higher C-rate on stability. For the full cell testing, the anodes prepared by the method described above were paired with NMC or NCA transition metal cathodes. C-rates were similar to those used in half-cell testing for both formation and rate testing, but depth of discharge was limited to 80%.

Testing of the silicon shows that is has a high degree of stability in the half-cell format (FIG. 9). Full cell testing was conducted to measure First Cycle Efficiency (FCE). When tested in a full cell vs. NMC cathode, nanoparticle silicon showed significant 1st cycle efficiency improvement when spray-agglomerated and/or carbon coated due the decrease in exposed silicon surface area (see Table 1).

What is claimed then, in one embodiment, is a spherical particle formed at least part by primary $SiO_{(2-x)}$ nanoparticles, wherein x=0.1 to 2, an internal void space, and an external elemental carbon coating, where the particle has a diameter of between and including 0.5 to 200 microns. In another embodiment, the internal void space further comprises 10% to 90% by volume of the particle, or in some others, the internal void space may form 30% to 70% by volume of the particle. In some embodiments, the particle further may further be 2% to 90% carbon by mass, while in others, the particle may be 10% to 50% carbon by mass. In some embodiments, the elemental carbon coating may be a coating selected from the group of coatings consisting of graphite, amorphous carbon, and graphene, and mixtures thereof.

In a further series of embodiments, the spherical particle may have a diameter of between and including 5 to 50 microns, while in others, the primary $SiO_{(2-x)}$ nanoparticles may have a diameter of between and including 10 to 1000 nanometers.

In some embodiments, the primary $SiO_{(2-x)}$ nanoparticles may have internal porosity, and in others, the primary $SiO_{(2-x)}$ nanoparticles may be a combination of both silicon metal and silicon oxide phases. The particle may further comprise lithium metal or lithium salt, while in other embodiments, the particle may also include one or more additional metals that can alloy with lithium.

A method for making a spherical particle of primary silicon nanoparticles, an internal void space, and an external carbon coating is also presented. Steps associated with such a method include, but are not limited to: dispersing $SiO_{(2-x)}$ nano-particles, wherein X=0 to 2, in a solvent to form a liquid mixture; spraying the liquid mixture to form spherical droplets; drying the mixture to form spherical agglomerates of the nanoparticles; and coating the agglomerates with carbon.

In a further series of embodiments, the method may also include a step of adding a pore forming agent to the solvent and removing said pore forming agent prior to a final coating of the agglomerates with carbon. In other embodiments, the method further may further include a step of adding a pore forming agent to the solvent, coating the agglomerates with an initial carbon coating, removing said pore forming agent, and forming a final coating of the agglomerates with carbon. Some embodiments further include the step of chemically reducing the carbon-coated $SiO_{(2-x)}$ particles, and the step of chemical reduction may further involve the step of chemically reducing the carbon-coated $SiO_{(2-x)}$ particles to $SiO_{(2-y)}$, where y is greater than x.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the products and methods are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method for making a spherical particle of primary silicon nanoparticles, an internal void space, and an external carbon coating, comprising the steps of:
    a. dispersing $SiO_{(2-x)}$ nano-particles, wherein X=0 to 2, and a pore former, in a liquid to form a liquid mixture;
    b. spraying the liquid mixture to form spherical droplets;
    c. freeze-drying the mixture to form spherical agglomerates of the $SiO_{(2-x)}$ nanoparticles;
    d. forming void spaces within the agglomerated nanoparticles;
    e. lowering the pressure and sublimating the liquid;
    f. coating the agglomerates with carbon; and
    g. chemically reducing the carbon-coated $SiO_{(2-x)}$ nanoparticles to $SiO_{(2-y)}$, where y is greater than x;
  wherein the pore former comprises a water soluble salt.

2. The method according to claim 1, wherein the agglomerated spherical nanoparticles have a diameter of less than 100 microns.

3. The method according to claim 1, wherein the void space comprises 30% to 70% by volume of the nanoparticles.

4. The method according to claim 1, wherein a carbon content of the agglomerated spherical nanoparticles is between 10% and 50% by mass.

* * * * *